June 26, 1928.

E. S. MIX ET AL 1,674,835

BELT FOR PERSONAL WEAR AND METHOD OF MAKING THE SAME

Filed Jan. 29, 1926

INVENTOR
Edwin S. Mix
Morris Sachs
BY
Davis & Simms
Their ATTORNEYS

Patented June 26, 1928.

1,674,835

UNITED STATES PATENT OFFICE.

EDWIN S. MIX AND MORRIS SACHS, OF ROCHESTER, NEW YORK, ASSIGNORS TO HICKOK MANUFACTURING COMPANY, INC., OF ROCHESTER, NEW YORK.

BELT FOR PERSONAL WEAR AND METHOD OF MAKING THE SAME.

Application filed January 29, 1926. Serial No. 84,542.

The present invention relates to belts for personal wear and to a method of making the same and an object of the invention is to provide a belt construction which has an insert and which will be inexpensive to manufacture and will be ornamental in appearance. Another object of the invention is to provide a belt having a longitudinally extending ornamental insert secured in a belt body in a manner to hide or protect the edges of the insert without any turned edges on the belt body.

To these and other ends, the invention consists of certain steps and devices, all of which will be hereinafter described: the novel features being pointed out in the appended claims.

Figure 1:
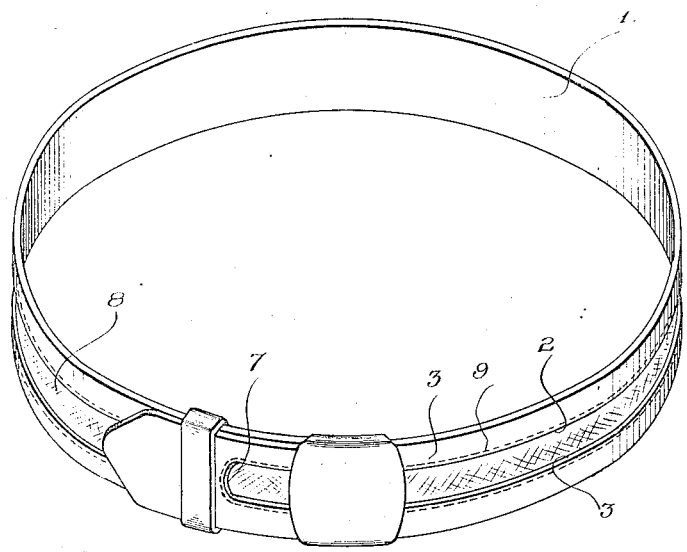
Fig. 1 is a perspective view of the belt constructed in accordance with this invention.
Figure 2:
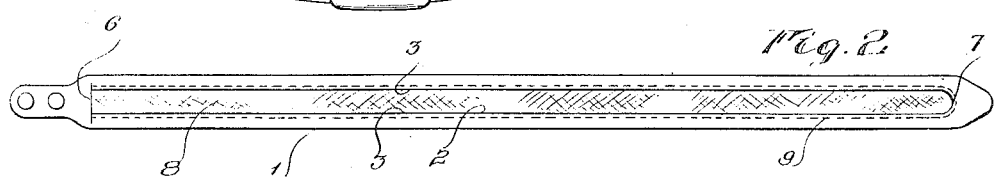
Fig. 2 is a view of the outer face of the belt straightened out.
Figure 3:
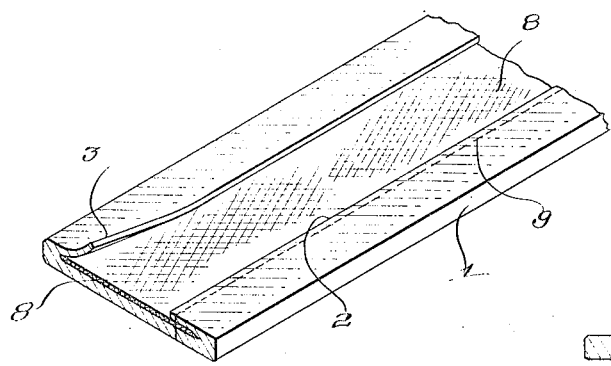
Fig. 3 is a fragmentary perspective view of the belt.
Figure 5:
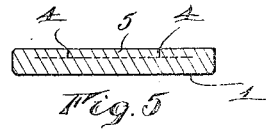
Fig. 5 is a sectional view of the belt after the latter has been provided with two longitudinal cuts.
Figure 4:
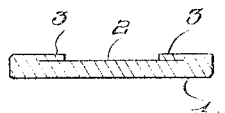
Fig. 4 is a section through the main body of the belt before the insert is secured in place.
Figure 6:
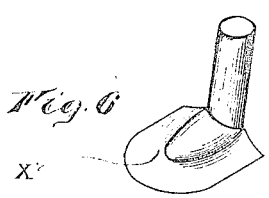
Fig. 6 is a perspective view of the skiving cutter.

In the illustrated embodiment of this invention, a strip of leather 1 in one piece, or other suitable material forming the body of the belt is provided with a longitudinally extending groove 2 and overhanging flanges or ribs 3 projecting from along opposite sides of this groove. This result is secured by making two parallel cuts or slits 4 in one face of the belt body as shown in Fig. 5, and thereafter simultaneously removing the portion 5 between the cuts or slits and undercutting the belt body beyond or on the outer sides of said cut or slits, as shown in dotted lines in Fig. 5, as by a skiving knife $x$ such as shown in Fig. 6, thereby providing the groove 2 and, at the same time, the overhanging portions 3 at opposite sides of the groove. The cutter or knife $x$ starts at the point 6 on the belt and travels longitudinally thereof to and slightly beyond a curved cut 7 adjacent the opposite end, but in spaced relation to the latter, the cutter passing beyond this curved cut 7 to undercut the end of the groove.

After the leather portion of the belt is cut as described, an ornamented strip 8 formed, in this instance, of ornamental woven fabric is fitted in the groove with its edges under the overhanging groove 3, and stitching 9 is passed through the overhanging portion, the ornamental insert and the main body of the belt, thereby effectively securing the ornamental strip in place.

In the illustrated embodiment of the invention the main body of the belt is provided with two longitudinally extending slits and the material between the slits is removed in the form of a strip so that waste of this material is eliminated. A strip is then inserted and secured in the channel formed between the two slits, with its edges secured in undercut grooves formed at opposite sides of the channel, and the insert piece is held in the channel by any suitable means as, for instance, by stitching.

What we claim as our invention and desire to secure by Letters Patent is:

1. A method of producing belts for personal wear which consists in providing two longitudinal cuts in the main belt material, simultaneously removing the belt material between the two cuts and undercutting the material on the outer sides of the central cuts to provide overhanging portions, introducing a strip in the groove thus formed, with its edges under the overhanging portions, and securing together the overhanging portions, the edges of the inserted strip and the main body of the belt.

2. A personal wear belt comprising a strip of material having a longitudinally extending groove cut in one face thereof, the sides of the groove having cuts providing overhanging portions along the sides of such groove, a strip covering the bottom of the groove and having its edges extending under the overhanging portions, and means securing together the overhanging portions, the edges of the inserted strip and the main strip.

EDWIN S. MIX.
MORRIS SACHS.